Dec. 23, 1969  D. W. SMITH  3,485,498
PHONOGRAPH TURNTABLE DRIVE SYSTEM
Filed July 11, 1966  2 Sheets-Sheet 1
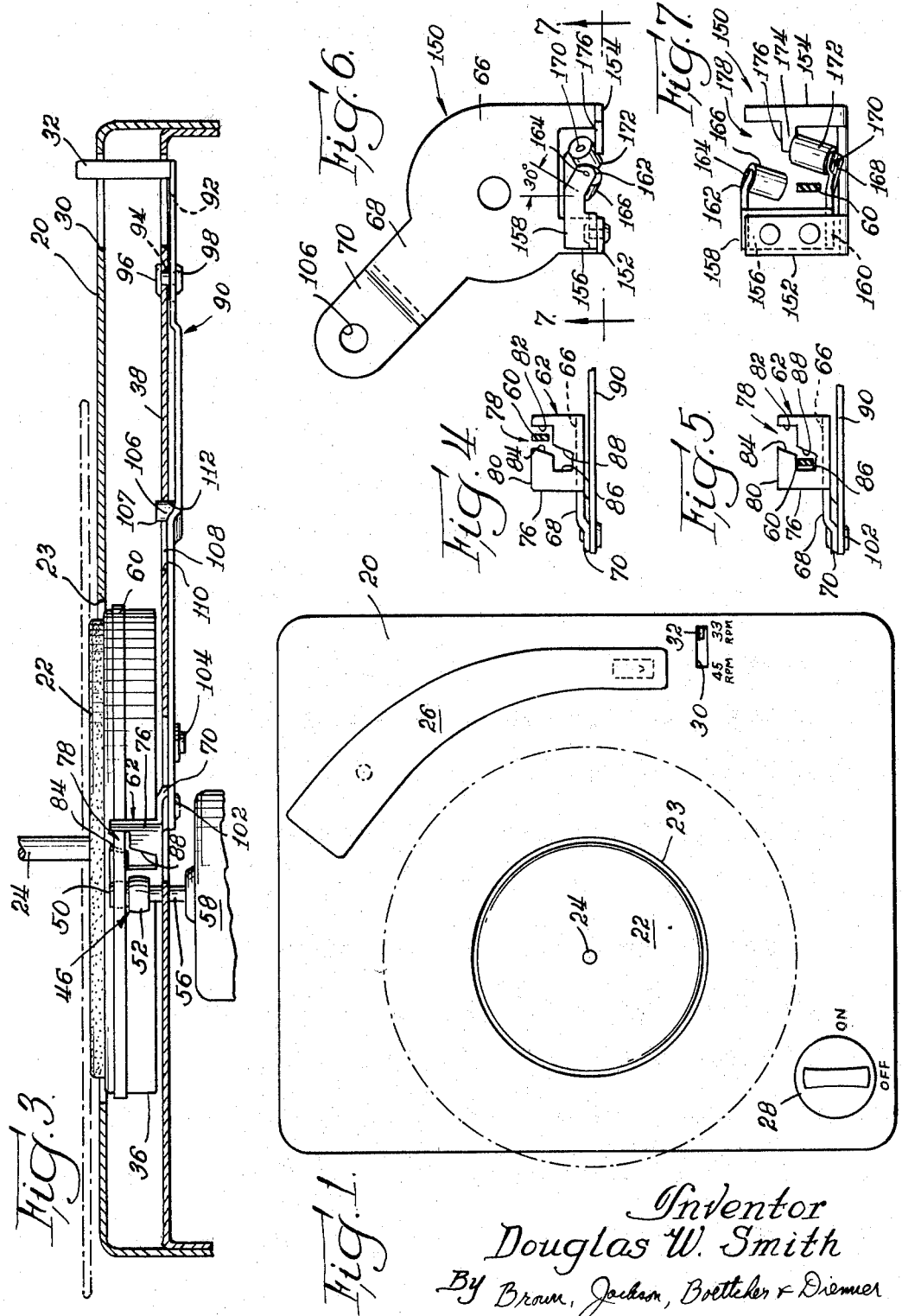
Inventor
Douglas W. Smith
By Brown, Jackson, Boettcher & Dienner
Attys Dec. 23, 1969   D. W. SMITH   3,485,498
PHONOGRAPH TURNTABLE DRIVE SYSTEM
Filed July 11, 1966   2 Sheets-Sheet 2
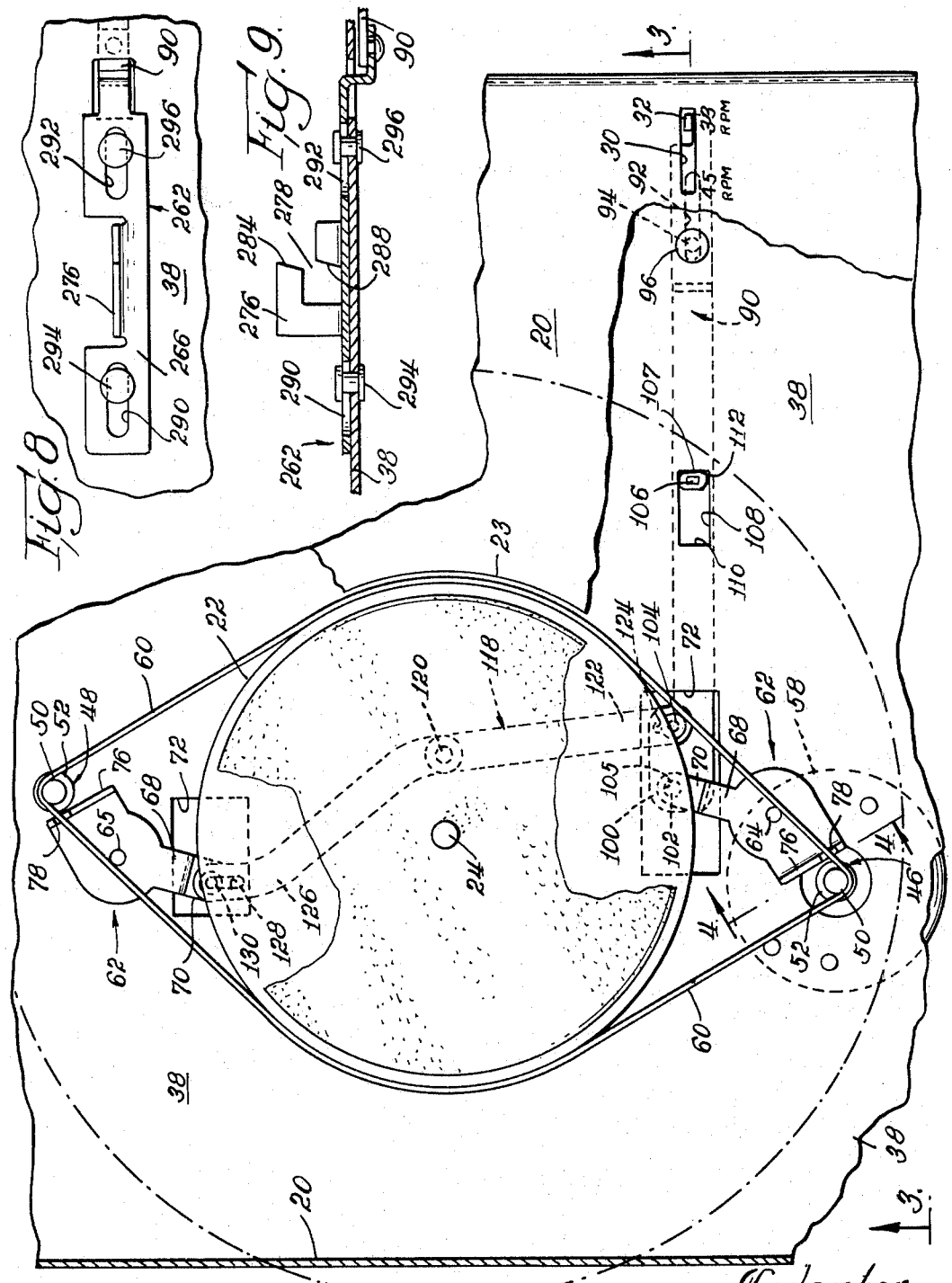
Inventor
Douglas W. Smith
By Brown, Jackson, Boettcher & Dienner
Att'ys.

United States Patent Office 3,485,498
Patented Dec. 23, 1969

3,485,498
PHONOGRAPH TURNTABLE DRIVE SYSTEM
Douglas W. Smith, St. Joseph, Mich., assignor to V-M Corporation, Benton Harbor, Mich., a corporation of Michigan
Filed July 11, 1966, Ser. No. 564,366
Int. Cl. G11b 3/60, 25/04
U.S. Cl. 274—9
11 Claims

ABSTRACT OF THE DISCLOSURE

A drive system for effecting selective variable speed rotation of a phonograph turntable includes a pair of connected coaxially disposed different diameter pulleys operatively associated with a drive motor, a drive belt drivingly engageable with one or the other of the pulleys and a flange on the turntable, and a belt shifter including inclined abutment surfaces adapted for movement to engage opposite sides of the belt and shift it from one pulley to the other upon selected movement of the shifter. One embodiment of the belt shifter is mounted for longitudinal movement and includes upper and lower inclined abutment surface portions adapted to engage adjacent surfaces of the belt in generally crosswise directions to shift the belt from one pulley to the other upon selected movement of the shifter. Another belt shifter embodiment is mounted for rotational movement and has inclined surfaces comprising rollers adapted to engage the belt and shift it from one pulley to the other upon selected rotation of the shifter. An alternative drive system employs a pair of coaxial different diameter pulleys on opposite sides of the turntable with a drive belt interconnecting selected pairs of the pulleys in driving relation to the turntable and a belt shifter disposed closely adjacent each pair of pulleys to selectively shift the belt from one set of similar size pulleys to the other set of pulleys.

---

This invention relates generally to a phonograph and more particularly to a phonograph turntable drive system for effecting different turntable rotational speeds.

In the field of phonographs, it is known to provide a turntable which may be rotated at varying rotational speeds to accommodate either 16, 33⅓, 45 or 78 r.p.m. records. It is further known to provide a turntable drive system which includes a flat belt interconnecting the turntable and a stepped drive pulley, the belt engaging one portion of the stepped pulley and a peripheral flange on the turntable below the record support surface to effect rotation thereof. In such drive systems, a means must be provided to shift the belt from one to the other of the stepped portions of the drive pulley to effect a change in the rotational speed of the turntable. Heretofore, belt shifting has been accomplished either manually or by means comprising complex arrangements of parts which have required complex actuating systems and have been expensive to manufacture.

The principal object of the present invention is to provide a novel and simplified multi-speed phonograph turntable drive system which overcomes the above disadvantages and effects different turntable speeds through a shift in a drive belt.

A feature of the invention is the provision of novel actuating mechanism which effects a belt shift and eliminates manual placing of the belt on one step portion or another of a stepped drive pulley.

Another feature of the present invention is the provision of an improved mechanical belt shifter wherein upon a small initial movement of a belt shifter mechanism, the belt tends to complete the shift without further continued movement of the shifter actuating lever.

Another feature of the present invention is the provision of a mechanical belt shifter which allows a belt shift to be initiated even though the turntable is not rotating.

Still another feature of the invention is the provision of an improved belt shifter which is inexpensive to manufacture and yet reliable and efficient in operation.

In furtherance of the above, I provide in a preferred form of my invention a pair of two-step crown pulleys on diametrically opposite sides of a turntable, one or each of which may be directly mounted on a turntable motor drive shaft and adapted to rotate the turntable through a flat belt which interconnects the turntable to one step portion of each of the respective pulleys. I provide a pair of belt shifter members, each of which is mounted in close proximity to a two-step pulley for pivotal movement about an axis parallel to the axis of the motor drive shaft and has an upstanding leg portion having a slot therein through which the drive belt passes. The slots include upper and lower inclined portions, the upper inclined portion being adapted to engage the belt and urge it downwardly upon rotation of the belt shifter members in a first direction while the lower inclined portion is adapted to engage the belt and urge it to an upward position upon rotation of the belt shifter members in a direction opposite to the first mentioned direction. Pivotal movement of the belt shifter members is effected through an actuating lever and a shift coupler linkage, the actuating lever having a speed change button portion protruding above the phonograph base plate for manipulation by the user.

The above described phonograph turntable drive system provides a novel and simplified mechanical arrangement wherein a phonograph operator may easily and quickly change the rotational speed of the phonograph turntable for playing at either of two different speeds, such as 33⅓ and 45 r.p.m., for example.

The foregoing and other advantages and uses of my invention will be apparent from the following description thereof, taken in conjunction with the accompanying drawings in which:

FIGURE 1 is a top plan view of the complete phonograph depicting the simplicity of the components revealed to and manipulated by the user;

FIGURE 2 is a top plan view, on an enlarged scale, of the phonograph with the base plate partially broken away to reveal the turntable drive belt and the belt shifters in cooperation with the actuating linkages;

FIGURE 3 is a fragmentary vertical sectional view showing a belt shifter and the actuating lever, the view being taken substantially on the line 3—3 of FIGURE 2;

FIGURE 4 is a detail view taken substantially on line 4—4 of FIGURE 2;

FIGURE 5 is a detail view similar to FIGURE 4 but illustrating the belt in its shifted position from that of FIGURE 4;

FIGURE 6 is a top plan view of a preferred embodiment of the present invention and illustrates a belt shifter member having roller means forming the inclined portions of the slot;

FIGURE 7 is an elevational view looking in the direction of the arrows 7—7 of FIGURE 6;

FIGURE 8 is a top plan view of a modified belt shifter adapted to move longitudinally of its own axis rather than moving arcuately; and FIGURE 9 is a side elevation of the belt shifter of FIGURE 8.

Referring now to the drawings, FIGURE 1 shows a phonograph comprising a base plate 20, a turntable 22 mounted for rotational movement in an opening 23 in the base plate 20, a conventional type spindle 24 projecting upwardly through the turntable in a known manner, and a conventional tone arm 26 pivotable about horizontal and vertical axes such that it may be manually or automatically placed upon a record on the turntable in playing position in the usual manner. A knob 28 for controlling an on-off switch 28 is conveniently located on the upper surface of the base plate 20 such that it is easily accessible to the operator. A slot 30 is provided in the upper surface of the base plate 20 and receives an upwardly projecting speed change button 32 which is slidable within the slot 30 to effect a change in the rotational speed of the turntable 22 as will be more fully explained hereinbelow.

Referring now to FIGURES 2 and 3, the base plate 20 is recessed or otherwise relieved at 23 to receive the turntable 22 such that the turntable is free to rotate without interference with the base plate 20. The turntable 22 has a downwardly depending peripheral flange portion 36 which projects below the lower surface of the base plate 20. The turntable 22 is rotatably mounted upon a support plate 38 in a conventional manner and is adapted to freely rotate in the recess 23 with its axis of rotation coincident with the central longitudinal axis of the spindle 24. The support plate 38 lies in a plane parallel to and below the lower horizontal surface of base plate 20 and may be secured to the base plate 20 in any suitable manner, such as by brackets, soldering, etc. (not shown). The support plate 38 serves to support the turntable 22 and other actuating mechanism as will be described hereinbelow. It will be understood that base plate 20 may be substantially eliminated by providing a record support turntable having a diameter large enough to overlie the pulley-belt drive system to be more fully described below. Such a large diameter turntable could be provided with a depending drive flange such as flange portion 36 on turntable 22 of FIGURE 3, or it could be mounted upon a small diameter drive turntable and rotatably driven therefrom through a friction disc or an indexing peg in a known manner.

A pair of two-step crown pulleys 46 and 48 are disposed on diametrically opposite sides of the turntable 22 and substantially equidistant therefrom. Each of the two-step crown pulleys 46 and 48 comprises an upper crowned portion 50 and a lower crowned portion 52, the upper portion 50 having a smaller diameter than the lower portion 52. While the crown shape of pulleys 46 and 48 is shown in FIGURE 3 as being substantially of a radial arcuate configuration, it will be understood that the high point may be a narrow flat centered on each step of the two-step pulleys with shallow tapering portions on either side of the high point. The upper and lower portions 50 and 52 may be made as an integral two-step pulley or may comprise separate pulleys which are coaxially disposed on and driven by a common support shaft. As will be described more fully hereinbelow, it may, at times, be desirable to reverse the relative positions of the large and small diameter portions 50 and 52 of the pulleys 46 and 48, making the upper portion of a larger diameter than the lower portion. The two-step pulley 46 is fixedly secured to the upper end of a support spindle 56 which constitutes the drive shaft of a constant speed electric motor 58 adapted to drive the turntable 22 in a manner to be described hereinbelow. The two-step pulley 48 is rotatably mounted on a support spindle (not shown) secured in a suitable manner to the support plate 38 such that the axis of rotation of the pulley 48 is parallel to the axis of rotation of pulley 46 while the respective upper and lower portions of pulleys 46 and 48 lie in the same horizontal planes. It will be understood that two-step pulley 48 could also be mounted on the drive shaft of an electric motor in similar fashion to pulley 46 if it is desired to use two turntable drive motors. Preferably, each of the pulleys 46 and 48 will be mounted upon the drive shaft of an electric motor if the turntable 22 is mounted on support plate 38 in a floating suspension manner. The use of a pair of pulleys so mounted will equalize the side pull on the floating turntable. If the turntable 22 is not supported on a floating suspension, only one of the crown pulleys, such as 46, need be mounted on an electric motor drive shaft. It will also be understood that in the latter case, a single two-step pulley 46 could be used instead of the pair 46 and 48.

A flat elastic belt 60 is mounted on either the upper or lower portions 50 or 52 of the two-step crown pulleys 46 and 48, and upon the depending peripheral flange portion 36 of the turntable 22 such that rotation of the two-step crown drive pulley 46 through the electric motor 58 effects rotation of the turntable 22. The belt 60 may be made of an elastic material such as rubber or the like and is of such a length that it may be readily placed upon the two pulleys 46 and 48 and the turntable flange 36 to provide the necessary tension to effect uniform rotation of the turntable 22. The depending peripheral flange portion 36 of the turntable 22 is of such a length that it will readily accommodate the drive belt 60 when the drive belt is mounted either upon the upper portions 50 or the lower portions 52 of the two pulleys 46 and 48 with the record support surface of the turntable 22 projecting above the plane of the base plate 20.

Belt shifting means in the form of a pair of belt shifter members 62, identical in configuration, are rotatably mounted on plate 38 about vertical support members at 64 and 65, respectively, which support members 64 and 65 are positioned equidistant from the central axis of the record centering spindle 24. The belt shifter members 62 are positioned in close proximity to their respective pulleys 46 or 48 on the tension side of the belt 60. Each of the belt shifter members 62 has a relatively flat body portion 66 which is supported on the support plate 38 to allow for rotational movement about the vertical support members 64 and 65. Each of the belt shifter members 62 has a radially projecting arm 68 having an outer end portion 70 which is bent downwardly into a plane parallel to the plane of the body portion 66 (see FIGURE 4) and is received within a rectangular opening 72 provided in the support plate 38. The vertical support members 64 and 65 are cylindrical shafts or pins secured to the support plate 38 in a conventional manner such as by a shoulder rivet, or by a threaded connection therewith.

Referring now to FIGURE 2 considered with FIGURES 3 and 4, each of the belt shifter members 62 has a generally upstanding arm portion 76 which is substantially perpendicular to the plane of the body portion 66 such that the plane of the upstanding arm 76 is parallel to the longitudinal axes of pulley support spindles 54 and 56. Each upstanding arm 76 faces and is disposed as closely as practical to, its associated pair of crowned pulleys. Referring specifically to FIGURE 4, the upstanding arm portion 76 of the shifter member 62 is provided with an opening or slot, shown generally at 78, which allows the belt 60 to pass through the slot when the belt 60 is in its upper or lower drive positions as determined by its position upon the upper or lower portions 50 or 52 of the drive pulleys 46 and 48. The slot 78 intersects an upper edge 80 of the upstanding arm 76 and has an upper portion defined by a vertical edge 82 and an inclined edge 84 which provide an upper opening through which the belt 60 may freely pass when in its upper drive position. A vertical edge 86 and an inclined edge 88 define a lower portion of the slot 78 through which the belt 60 may freely pass when in its lower operating position. The upper inclined edge 84 is preferably disposed at an angle of approximately 20 degrees from the vertical plane of the belt while the lower inclined edge portion 88 is preferably disposed at an angle of approximately 23 degrees from the vertical plane of the belt. The respective angles of incline of edges 84 and 88 may be varied as desired within the limitations established by the geometry of the linkage mechanism and the allowable throw of the shifter members. It will be understood that with a greater angle of incline, the belt will be urged upward or downward at a greater rate with a consequent more rapid speed shift.

As described above, the rectangular openings 72 provided in support plate 38 are adapted to receive the outer offset ends 70 of the shifter members 62. The rectangular openings 72 have widths and lengths sufficient to receive the end portions 70 such that pivtoal movement of the belt shifter members 62 to effect shifting of the belt 60 may take place without the end portions 70 interfering with the support plate 38.

A belt shifter actuating lever 90 (FIGURES 2 and 3) is slidably mounted on the lower surface of the support plate 38. The actuating lever has an elongated slot 92 which receives a pin 94 therethrough, the pin 94 having head portions 96 and 98 which respectively abut the support plate 38 and the lever 90 to retain the lever 90 in close sliding relationship with the support plate 38 while allowing it to be moved longitudinally and also permitting rotational movement about pin 94. The end 100 of the actuating lever 90 opposite the elongated slot 92 is positioned to underlie the rectangular recess 72 in the support plate 38 and receives two pins 102 and 104 which project normal to the plane of the end 100. The pin 102 is positioned on the lever 90 such that it will be rotatably received within an aperture 105 provided in the end portion 70 of the lower belt shifter member 62 (viewing FIG. 2). The lever 90 is in its right hand (33⅓ r.p.m.) position. The upper and lower ends of the pin 102 may be swaged or otherwise capped adjacent the upper surface of end portion 70 and lower surface of lever 90 to positively retain the belt shifter member 62 and the actuating lever 90 in pivotal sliding relation to each other while serving to support the inner end 100 of the actuating lever 90. The speed change button 32 projects through the slot 30 provided in the base plate 20 for actuating the lever 90 as described hereinabove and button 32 is at the outer end (the right end as viewed in FIGURE 2) of the actuating lever 90 when the belt shifter 62 is in the position wherein the belt 60 is mounted upon the upper portions 50 of the pulleys 46 and 48.

The actuating lever 90 has an upstanding stop member 106 which projects through a slot 108 within the support plate 38. The stop 106 has a rubber bumper 107 mounted thereon which cooperates with end edges 110 and 112 of slot 108 to limit the longitudinal travel of actuating lever 90 with the rubber bumper 107 abutting end edge 110 when the speed change button 32 is in a first turntable speed position and abutting end edge 112 when the speed change button is shifted to a second turntable speed position.

A shift coupler member 118 (FIGURE 2) for interconnecting the two belt shifter members 62 is pivotally mounted at 120 to the underside of the support plate 38. The end 122 of the coupler member 118 has an elongated aperture 124 which receives the pin 104 in sliding relation. The other end 126 of the coupler member 118 has an elongated aperture 128 therein which receives a pin or vertical shaft member 130 secured to the outer end 70 of the shifter member 62 such that the end 126 underlies and forms a sliding pivotal connection with the extended end 70. It will be seen that longitudinal movement of the actuating lever 90 toward the left, as viewed in FIG. 2, will cause the coupler member 118 to pivot about the pivotal axis 120 in a clockwise direction. A clockwise movement of the coupler member 118 causes the upper belt shifter member 62 to be pivoted about the supporting pivotal axis 64 in a counterclockwise direction while the lower belt shifter member 62, being pivotally connected to actuating lever 90, also undergoes a counterclockwise pivotal movement about the supporting pivotal axis 64.

Thus, during operation, a leftward longitudinal movement of the actuating movement of the actuating lever 90 effects simultaneous identical pivotal movements of the belt shifter members 62 about their respective axes 64 and 65. Such movement causes the inclined surface 84 of each shifter 62 to bear against the moving belt 60 and to urge the belt downwardly from the FIGURE 4 position to the FIGURE 5 position, lowering it from the smaller diameter pulley 50 to the larger diameter pulley 52 whereby the speed of the turntable is increased.

While the above-described embodiment of the invention allows a simple efficient belt shift to be effected, a preferred embodiment of the invention utilizes belt shifter members having rotatable rollers which engage the belt upon a belt shift, thus reducing the frictional drag on the belt and allowing a shift to be initiated without the turntable and belt moving. This preferred embodiment is particularly useful when employing a low torque turntable drive motor. Referring now to FIGURES 6 and 7, a belt shifter member 150 includes a relatively flat body portion 66 having a radially extending arm 68 with the outer end 70 of the arm 68 being disposed downwardly in a plane below the plane of the main body portion 66 similar to that of the belt shifter members 62 described hereinabove. An upstanding arm formed of two portions 152 and 154 lies in a plane normal to the plane of the main body portion 66, and is substantially parallel to the axes of rotation of the drive pulleys 46 and 48 when the belt shifter members 150 are utilized in a turntable drive system similar to that shown in FIGURE 2. A U-shaped roller bracket 156 is riveted or otherwise suitably secured to the upstanding arm portion 152 and has upper and lower horizontally extending arm portions 158 and 160. The outer end portion 162 of the upper arm 158 is turned at an angle relative to said arm 158 and is preferably disposed downwardly at an angle of approximately 20 degrees to the plane of the arm 158. The bend line for end portion 162 is at an angle of 30° to arm 158 as shown in FIGURE 6. A pin 164 is secured normal to the end portion 162 and rotatably supports a roller member 166. An outer end portion 168 of the lower arm 160 is turned at an angle relative to the arm 160 and is bent out of the plane of said arm and defines a plane which is downwardly inclined at an angle of approximately 25 degrees relative to the plane of the arm 160. The bend line for end portion 168 is also at an angle of 30°. As may be seen, both rollers are supported from a single end. The end portion 168 has a pin 170 secured normal thereto which rotatably supports a roller member 172.

The upstanding arm portion 154 includes a projection 174 lying in the plane of arm 154 and positioned at a height such that an upper edge surface 176 is approximately even with the upper extremity of the lower roller 172. The projection 174 serves to limit the downward movement of the belt 60 when in operating position in slot or opening 178 so that the belt 60 will not accidentally move downwardly behind (i.e., to the right of) the roller 172 when viewing the belt shifter member as in FIGURE 7. When in their installed positions, a pair of belt shifter members 150 are preferably pivotally mounted similar to the belt shifter members 62 in FIGURE 2 whereupon rotational movement of the belt shifter members will cause either the upper or lower rollers to engage the belt 60 and bias it either upwardly or downwardly depending upon the starting position of the belt 60. Due to the rollers 166 and 172, the belt shifter members 150 may be rotated to urge the belt upwardly or downwardly with less frictional drag against the turntable drive belt 60 than is obtained wiith the belt shifters 62 illustrated in FIGURES 4 and 5. A belt shift may thus be initiated without the belt and turntable being in motion and the shift will be automatically completed when the turntable rotation begins due to the action of the belt on the pulley crowns as more fully described hereinbelow. The surfaces of the rollers 166 and 172 nearest the belt 60 define abutment means for engaging the belt in the same manner as surfaces 84 and 88 of the belt shifters of FIGURES 1 through 5, but the rollers are particularly advantageous when a low torque motor is used.

It will be understood that the above described construction of shifter members 150 may be modified somewhat without departing from the basic operational features. For example, horizontally extending arm 156 may be formed integral with the upstanding arm portion 152, with the outer end 162 of arm 156 being bent downwardly to provide the same angularity with respect to the plane of arm 156 as described hereinabove. Horizontally extending arm 160 may be formed integral with the flat body portion 66 adjacent the lower end of upstanding arm portion 154. In this latter construction, arm 160 would extend to the left from upstanding arm 154 when viewing FIGURE 7, and the end 168 would be bent upwardly at an angle of approximately 25 degrees relative to the plane of body portion 66. The bend line for end portion 168 would be approximately 30 degrees when considered in a reverse angular direction to the bend angle shown in FIGURE 6. Such a modified shifter member would also include a projection 174 to limit downward movement of the belt during operation.

As was described above with respect to the angularity of edge portions 84 and 88 of shifter members 62, the angularity of the rollers 166 and 174 may be varied from the angles specified hereinabove. Increasing the angularity of the rollers relative to the plane of the belt 60 will cause the belt to shift more rapidly. The allowable angularity of the rollers is determined by the geometry of the shift linkage arrangement and by the desirability of introducing the rollers to the belt such that the line of contact of the rollers against the belt is disposed at approximately 90 degrees to the direction of belt travel.

In operation, belt 60 is positioned upon the peripheral flange 36 of the turntable 22 and upon either the upper pulley portions 50, as shown in FIGURES 2 and 3, or the lower portions 52 of the two-step crown pulleys 46 and 48. Assuming that the belt 60 is installed on the upper portions 50 of the pulleys 46 and 48 for a turntable rotational speed of 33⅓ r.p.m., and the turntable is rotating, an inward movement (to the left in FIGURE 2) of the actuating lever 90 by leftward movement of the speed change button 32 will cause the belt shifter members 62 to be rotated in a counterclockwise direction. The upper inclined edges 84 thereof will then engage the belt 60 and incline it out of its normal plane, thereby tending to lengthen it as the edge portions 84 carry the belt outwardly. The elastic properties of the belt resist the attempt to lengthen it and the lower inclined edge of the belt urges it downwardly. As the belt is moved outwardly at the points of contact with the shifters, it creeps downwardly along the edges 84 of the shifters. The lower edge of the belt will then engage the larger diameter lower portions 52 of the pulleys 46 and 48 and be urged thereon until the edge of the belt reaches beyond the crown of the pulley. The belt will then pull itself away from the belt shifter members 62 and center itself on the crown of lower pulley portions 52 to thereby complete a speed change to a different turntable rotational speed such as 45 r.p.m.

Conversely, when it is desired to change the turntable rotational speed from 45 r.p.m. to 33⅓ r.p.m., one merely moves the actuating lever 90 outwardly (to the right in FIGURE 2) through movement of the push button 32, whereupon the belt shifter members 62 are rotated in a clockwise direction. The lower inclined edge portions 88 of the shifter members 62 then engage belt 60, incline it out of its normal vertical plane, and bias it inwardly. The belt is urged upwardly and creeps along the edge portions 88 until the upper edge of the belt has contacted the crown of the smaller diameter upper portions 50 of the pulleys 46 and 48. The belt will then pull away from the belt shifter members 62 and center itself on the crown of upper pulley portions 50, thereby completing the turntable speed change.

While the belt shifter mechanism of the present invention has been described in conjunction with pulleys having upper crown portions of a smaller diameter than the lower crown portions, and the shifters have been described as shifting the belt downwardly to the large diameter portions and upwardly to the smaller diameter portions, it may at times be desirable to reverse the relative positions of the large and small diameter crown portions of the pulleys. This would be particularly desirable to maintain wobble of the small diameter crown portions to a minimum where there is some whip or play in the electric motor drive shaft 56 or in the support shaft for pulley 48. In reversing the relative positions of the large and small diameter pulleys, the edge portions 84 and 88 of shifter members 62 would be reversed accordingly. The relative angles of inclination of the edge portions would be reversed such that inclined edge 84 would engage the inner surface of the belt and urge the belt upwardly, and the inclined edge 88 would engage the outside surface of the belt and urge it downwardly during a belt shift.

FIGURES 8 and 9 show an alternate form of belt shifter 262 which is similar to the belt shifter of FIGURES 1 through 5. Shifter 262 has an arm 276 normal to the associated base 266 with an opening 278. Abutment surfaces 284 and 288 (FIGURE 9) at upper and lower portions of the opening or slot 278, respectively, are arranged and function the same as surfaces 84 and 88 of the belt shifter of FIGURES 1 through 5. Base 266, however, is formed for rectilinear movement rather than rotary movement for effecting belt shifting. Two elongated slots 290 and 292 are formed in the base 266 for the receipt of headed pins 294 and 296 fixed on plate 38, whereby the belt shifter 262 may be moved longitudinally through an appropriate connection to actuating lever 90, guided by the pins.

While I have illustrated my invention in preferred forms, I do not intend to be limited to those forms, except insofar as the appended claims are so limited, since modifications coming within the scope of my invention will be readily apparent to others with my disclosure before them.

I claim:

1. For use in a drive system for a phonograph turntable having a flange for engagement with a drive belt adapted to be driven from a motor, the improvement comprising a pair of connected, coaxially disposed, different diameter pulleys adapted to be driven from said motor with said belt being drivingly engageable with one or the other of said pulleys for driving the turntable; and belt shifting means disposed closely adjacent the pulleys and comprising abutment means adapted to be moved to engage the belt from opposite sides in a direction generally crosswise of the direction of movement of the belt and shift the belt from one pulley to the other for changing the speed of the turntable, said abutment means comprising upper and lower surface portions disposed at the level of the upper and lower pulleys, said upper surface portion being inclined so as to direct the belt downwardly upon engagement with the adjacent surface of the belt, and said lower surface portion being inclined so as to direct the belt upwardly upon engagement with the adjacent surface of the belt, said surface portions being shiftable laterally substantially at the levels of the respective pulleys to engage the belt.

2. The improvement of claim 1 wherein the vertical height of each surface portion approximates the vertical height of the pulley surface opposite it.

3. The improvement of claim 1 wherein each surface portion comprises the surface of a roller.

4. The improvement of claim 1 wherein the belt is rectangular in cross section, the upper pulley has the smaller diameter, the lower pulley has the larger diameter, the upper surface portion is inclined toward the plane of the adjacent belt surface at an angle of approximately 20°, and the lower surface portion is inclined toward the plane of the adjacent belt surface at an angle of approximately 23°.

5. For use in a drive system for a phonograph turntable which turntable has a flange for engagement with a drive belt which is adapted to be driven from a motor, the improvement comprising a pair of connected coaxially disposed pulleys adapted to be disposed to one side of said turntable and to be driven from said motor with said belt being drivingly engageable with one or the other of said pulleys for driving the turntable, a second pair of connected coaxially disposed pulleys of the same shape as the first pair and adapted to be disposed on the opposite side of said turntable and to be drivingly associated with said belt and turntable, and belt shifting means disposed closely adjacent each pair of pulleys and comprising abutment means adapted to be moved to engage the belt from opposite sides in a direction generally crosswise of the direction of the movement of the belt and shift the belt from corresponding pulleys on opposite sides of the turntable to the other corresponding pulleys on opposite sides of the turntable for changing the speed of the turntable, the engagement being with the outer surface of the belt considered from the belt's relation to the pulleys, when the belt is to be shifted from the large diameter pulleys to the smaller diameter pulleys, and the engagement being with the inner surface of the belt when the belt is to be shifted from the smaller diameter pulleys to the larger diameter pulleys.

6. The improvement of claim 5 together with linkage means associated with said belt shifter means to effect simultaneous movement of them into engagement with the belt.

7. The improvement of claim 5 wherein the belt shifting means are associated with the belt at the tension side thereof relative to the respective pulleys and said abutment means of each belt shifting means comprises an upper surface portion and a lower surface portion, each portion being so inclined relative to the plane of the belt that it is adapted, upon engagement with the adjacent surface of the belt, to direct the belt from one to the other of the pulleys.

8. For use in a drive system for a phonograph turntable which drive system includes a turntable having a flange for engagement with a drive belt which is adapted to be driven from a motor, and a pair of connected, coaxially disposed, different pulleys adapted to be driven from said motor with said belt being drivingly engageable with one or the other of said pulleys for driving the turntable, said belt shifting means comprising; an arm disposed close to said pair of pulleys, means for supporting and moving said arm, means defining an opening in said arm having connected upper and lower portions each of which portions provides space through which the belt on its tension side passes in approaching one or the other of said pulleys, said means defining the opening comprising a pair of inclined abutment surfaces on opposite sides of the opening which are adapted to engage the belt in a direction generally crosswise of the direction of movement of the belt, one of the abutment surfaces being adjacent the path of the belt when the belt is engaged with one pulley and is passing through the upper portion, and the other abutment surface being adjacent the path of the belt when the belt is engaged with the other pulley and is passing through the lower portion of the opening, said abutment surfaces engaging the belt at an angle from opposite sides to shift the belt from one pulley to another.

9. The belt shifting means of claim 8 wherein the arm is disposed generally parallel to the axis of the pulleys, and said upper portion of the opening is at the level of the upper pulley and the lower portion of the opening is at the level of the lower pulley, said inclined abutment surfaces defining a generally upstanding side of a portion of the opening and being movable laterally of the axis of the pulleys to cause movement of the belt axially of the axis of the pulleys from one pulley to another, by reason of the inclination of said abutment surfaces.

10. The belt shifting means of claim 9 wherein, relative to a flat belt moving in a vertical plane toward the pulleys, the abutment surfaces comprise rollers with the axis of one roller being tilted from the vertical such that the upper end is closer to the belt and said upper end also leans generally in the direction of movement of the belt, and with the axis of the other roller being tilted from the vertical such that its upper end is farther from the belt and said upper end also leans generally opposite to the direction of movement of the belt.

11. The belt shifting means of claim 10 wherein each roller is supported from one end and the arm has a projection adjacent an unsupported end of one roller to prevent the belt from assuming a position on the wrong side of the roller.

References Cited

UNITED STATES PATENTS

| 1,180,063 | 4/1916 | Morgan | 74—242.4 |
| 3,303,711 | 2/1967 | Karecki et al. | 74—242.3 |

FOREIGN PATENTS

| 145,492 | 11/1903 | Germany. |
| 277,531 | 9/1930 | Italy. |
| 4,284 | 1894 | Great Britain. |
| 14,799 | 1893 | Great Britain. |

HARRY N. HAROIAN, Primary Examiner

U.S. Cl. X.R.

274—39